Aug. 1, 1939.　　　J. J. JAKOSKY　　　2,167,950

METHOD AND APPARATUS FOR ELECTRICAL EXPLORATION OF SUBSURFACE

Filed June 1, 1937

INVENTOR.
John Jay Jakosky,
BY Arthur P. Knight and
Alfred W. Knight
ATTORNEYS.

Patented Aug. 1, 1939

2,167,950

UNITED STATES PATENT OFFICE 2,167,950

METHOD AND APPARATUS FOR ELECTRICAL EXPLORATION OF SUBSURFACE

John Jay Jakosky, Los Angeles, Calif.

Application June 1, 1937, Serial No. 145,795

7 Claims. (Cl. 175—182)

This invention relates to geophysical prospecting and pertains more particularly to an improved electrical method and apparatus for use in determining the geologic nature and characteristics of the subsurface.

The principal object of the invention is to provide a method for the electrical exploration of the subsurface by which surveys may be conducted more rapidly and accurately than with previous methods, and an apparatus for use therewith.

Another object of the invention is to provide an electrical method and apparatus for the exploration of the subsurface in which the potential electrodes are located adjacent an energizing electrode so that advantage may be taken of the steepest part of the potential drop curve, where small changes in the subsurface give the greatest measurable differences in potential.

The conventional methods take potential measurements between widely separated points and in some instances these points are separated on the order of from 5,000 to 15,000 feet. It is practically impossible to conduct such surveys during magnetic storms since the severe and varying earth currents caused thereby produce rapidly fluctuating potential differences between such widely separated points. For example, the potential produced by these earth currents may vary from 25 to 500 millivolts in a few seconds, such variations often being higher than the potentials artificially produced between measuring electrodes for survey purposes. As a consequence surveyors utilizing conventional methods must remain idle during these storms, resulting in a considerable loss of time and money.

Since these ground currents are regional in character, the potentials caused thereby are roughly proportional to the separation of the potential electrodes on the surface of the earth. Thus for a relatively short separation of potential electrodes the errors introduced by these ground currents are negligible and it is a particular and important object of this invention to minimize the effect of these ground currents, with a consequent increase in accuracy and decrease in expense due to loss in time, but utilizing potential electrodes which are separated by relatively short distances.

A further object of one preferred form of the invention is to provide a method and apparatus for the electrical exploration of the subsurface in which the energizing current is adjusted to produce a given potential between the measuring electrodes at each position of the energizing electrodes.

An important object of the invention is to provide a method for the electrical exploration of the subsurface which produces a great saving in wire and other apparatus required to practice the method.

Another object of the invention is to provide an electrical method and apparatus for the exploration of the subsurface, in which an electric current is passed through the earth between a pair of spaced energizing electrodes connected to the surface of the earth and to a source of electrical current, and in which potential electrodes are located adjacent one or both of the energizing electrodes, that requires only one wire between the position of each energizing electrode and the centrally located position of the source of current, instead of the conventional two wires that are ordinarily utilized to carry the energizing current and to connect the potential electrodes to the potential measuring device, which is usually located adjacent the current source.

A particular object of the invention is to provide a method and apparatus for the electrical exploration of the subsurface that requires less field wires than are utilized by previous methods, which produces a resultant decrease in the labor required and a general decrease in the cost of such exploration.

Another important object of the invention is to provide a method and apparatus for the electrical exploration of the subsurface in which less time and labor is involved in changing from one electrode arrangement to another in making successive readings at different positions of one or both of the energizing electrodes.

A further object is to provide a method and apparatus for electrically ascertaining the general anisotropic properties of the subsurface, the effects of sloping contacts, and the general non-symmetry of the subsurface.

Another object of the invention is to provide an electrical method and apparatus by which faults and contacts in the subsurface may be quickly and accurately located.

Another important object of the invention is to provide a method and apparatus for the electrical exploration of the subsurface which will definitely differentiate the effects of near-surface inhomogeneities from the effects of the deeper lying structures of economic importance.

Further objects and advantages of the invention will either be more specifically brought out in the following description or will be apparent therefrom.

According to this invention a potential difference is created between two spaced points on the surface of the earth by passing an electric current through the earth between a pair of electrodes which are electrically connected to the earth and spaced from one another by a known distance along the surface thereof. The potential difference existing between said points during the flow of said current and the value of the current passed through the earth constitute two quantities whose relation is dependent upon the geologic nature and characteristics of the subsurface traversed by said current. Thus by measuring one of said quantities while the other quantity has a known value, I am able to ascertain the geologic nature and characteristics of the subsurface traversed by the current.

The points between which the potential difference is created, and utilized as a basis of measurement, are located adjacent one of the electrodes and preferably spaced from one another by a distance which is less than one-fifth the distance between the electrodes, and at least one of said points is preferably within a distance from said one electrode which is also less than one-fifth of the distance between the electrodes.

I have found that by maintaining this relatively close separation of the points with respect to one another and with respect to the nearest electrode, a greater sensitivity of measurement may be obtained so that subsurface properties may be more positively and definitely ascertained.

I also prefer to maintain at least one of said points substantially on a straight line passing through the electrodes, said point being located either between said electrodes or on the side of one of the electrodes away from the other electrode. In the event that only one of the points is located substantially on the line passing through the electrodes, I prefer to locate the other point closely adjacent the nearest electrode, for example, from five to fifty feet therefrom, and to one side of said straight line. Said other point may, however, be also located on said straight line, in which event the two potential points are preferably located at the same side of the adjacent energizing electrode, and either between the two energizing electrodes or at the side of said adjacent electrode away from the other energizing electrode.

In making a complete survey in accordance with this invention, the above steps are repeated with different spacial relationships of the energizing electrodes, as by moving one or both of the electrodes outwardly or inwardly along a straight line to progressively vary the spacing therebetween, and the spacing of the two potential points with relation to one another and also with relation to the adjacent energizing electrode is preferably maintained the same at each of the successive spacial relationships of the energizing electrodes.

In order to obtain as complete information as possible, I prefer to take measurements, during a survey, which are based upon the potential differences existing adjacent each energizing electrode, for each spacial relationship of such electrodes.

The apparatus of this invention may comprise, in general, a source of electric current for passing an electric current through the earth between a pair of electrodes which are electrically connected to the earth and spaced from one another along the surface thereof, to create a potential difference between a pair of spaced points located as above described, on the surface of the earth. Since the current passed through the earth and the potential difference existing between said points constitute two quantities whose relative value is dependent upon the geologic nature and characteristics of the subsurface traversed by the current, the apparatus further comprises means for measuring one of said quantities while the other quantity has a known value. Such means may comprise a current measuring instrument for measuring said energizing current and a potential indicating device, such as a potential measuring instrument for measuring the potential between the potential electrodes, or it may comprise said current measuring instrument and means for signifying when the potential has reached a certain predetermined value between said potential electrodes. In any event, it will comprise means for obtaining a record of energizing current and the corresponding potential existing between the potential electrodes. The apparatus may also comprise a potential indicating device which includes means for impressing a known potential across the above-mentioned points and for indicating when the potential existing during the flow of current is equal to the impressed potential.

Thus the apparatus would comprise an electric circuit connected to the electrodes and means for indicating the value of the current. Such means will comprise, for example, a current indicating meter such as an ammeter, or means for maintaining the value of the current at a known and substantially fixed value.

I also find it advantageous to provide a signalling system for transmitting signals from the position of the potential indicating device, which is usually located adjacent an electrode, to the position of the current indicating or measuring means, which is usually located intermediate said electrodes along with the current source which may be provided with suitable current adjusting means.

The term "electric current" as used herein will be understood to include direct, alternating, and pulsating currents, since any of such currents may be utilized in the practice of this invention. The current flowing through the earth between the energizing electrodes may be maintained constant and potential readings may be taken during the flow of such current, or the value of the energizing current may be recorded along with the corresponding potential value, or the energizing current required for a given potential reading may be recorded for each corresponding potential reading. In any event, the corresponding values of current and existing potential will be ascertained for each measurement so that an electrical characteristic of the earth included between the current electrodes may be determined from the comparison of the values of said current and potential. Conductivity is an example of such a characteristic and may be considered as the reciprocal of resistance in the case of direct current or the reciprocal of impedance in the case of alternating current. When suitable energizing and measuring circuits are used, other electrical characteristics such as resistance, impedance, relative permitivity, phase angle, etc., may be determined.

I have illustrated diagrammatically an apparatus layout according to my invention along with a diagram of a commonly used form of apparatus and a curve denoting the distribution of potential along the surface of the earth between a pair of current electrodes, and referring thereto:

Figure 1:
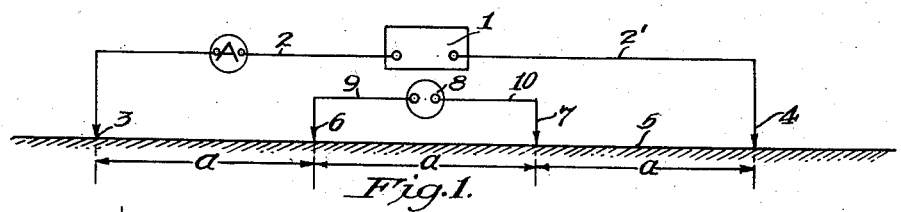
Fig. 1 is a diagrammatic layout of apparatus for taking potential measurements according to a well-known manner.

The conventional apparatus shown in Fig. 1 is one which is commonly used, and is shown as comprising a source of electric current 1 connected through insulated conductors 2 and 2' to a pair of current or energizing electrodes 3 and 4 respectively, which are connected to the surface of the earth indicated at 5. Potential electrodes 6 and 7 are connected to the surface of the earth and to a potential measuring device 8 through insulated conductors 9 and 10. The distances between the respective electrodes 3, 6, 7, and 4 are ordinarily equal to one another, so that the distance between the two potential electrodes 6 and 7 is on the order of one-third the distance between the energizing electrodes 3 and 4. Thus the total amount of insulated conductor which is required for running such a survey is on the order of one and one-third times the total distance between the energizing electrodes, which entails considerable expense, not only in the original cost of the high quality insulated wire but also the labor and time required for its handling and maintenance during field operations. Since the distance between the energizing electrodes is on the order of a mile, or miles at times, the total amount of insulated wire used for such a survey becomes an important item and any saving that can be made in the amount of wire used for such a survey is extremely important. This prior method not only uses considerable wire, but also has another disadvantage in that measurements are taken in the relatively flat portion of the potential curve.

Figure 2:
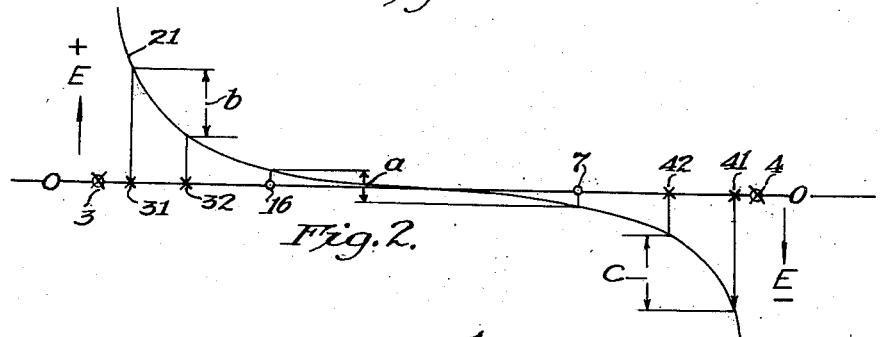
Fig. 2 is a curve denoting the potentials existing at points along the surface of the earth between a pair of current or energizing electrodes when current is passing through the earth therebetween.

Referring to Fig. 2, the line O—O represents the reference potential line and distances therealong may be also used to designate the separation of the current or energizing electrodes. Positive and negative potentials are indicated by distances above and below the line O—O respectively, and the potentials existing on the surface of the earth between the electrodes 3 and 4 of Fig. 1 are indicated by the curved line 21. The potential existing between the electrodes 6 and 7 is indicated by the dimension arrows at a. It will be noted that this difference in potential is relatively small compared to the total potential difference between the points 31 and 41 adjacent the electrodes 3 and 4, and that the distance between the electrodes 6 and 7 could be varied considerably without affecting materially the difference in potential therebetween. This is true because the potential drop curve is relatively flat over the greatest portion of the distance between the current electrodes. It should also be noted that the potential between 3 and 4 may be varied considerably without producing any appreciable variation of the potential existing between 6 and 7, since the variations in potential existing at 6 and 7 represent only a very small percentage of the total potential existing between these points. Thus the use of such measuring configuration does not lend itself to the detection of small variations in the electrical path between the electrodes 3 and 4, and does not produce well-defined variations for major changes in the subsurface structure.

Figure 3:
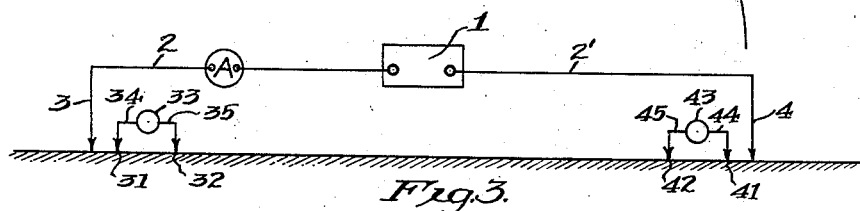
Fig. 3 is a diagrammatic representation of an apparatus layout according to my invention.
Figure 4:
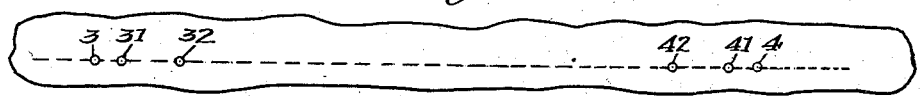
Fig. 4 is a plan view thereof showing a field arrangement of the energizing electrodes and potential points, according to one embodiment of the invention.

Referring to Fig. 3, I have shown current electrodes at 3 and 4 connected to a source of electric current 1 as in Fig. 1, while a pair of potential electrodes 31 and 32 are shown located at two points which are closely adjacent the electrode 3 and another pair of potential electrodes 41 and 42 are shown located at two other points which are closely adjacent the current electrode 4. The electrodes 31 and 32 are shown connected to a potential measuring device 33 by two relatively short conductors 34 and 35, and the electrodes 41 and 42 are connected to a similar potential measuring device 43 by short conductors 44 and 45. The respective electrodes and points are preferably arranged in a straight line as shown in Fig. 4 and the distance between the electrodes 3 and 31 and the electrodes 4 and 41 is relatively short, being on the order of one-fifth or less the total distance between the electrodes 3 and 4, while the distance between the points at which the electrodes 31 and 32 and 41 and 42 are located, is on the order of one-fifth or less of the total distance between the electrodes 3 and 4.

This arrangement of apparatus has advantages which were not recognized by previous workers in the art and produces results which could not be obtained with previous methods or apparatus. Considerable labor, maintenance and material are saved in that the total length of conductor needed for a survey is greatly reduced over the amount required in Fig. 1. The total length of conductor required for the layout shown in Fig. 3 would be approximately one and two-tenths of the length of the conductor required to connect the electrodes 3 and 4 and represents a saving of approximately 25 per cent over the layout shown in Fig. 1. This would be true for relatively short separations of the electrodes 3 and 4; however, greater savings are afforded for greater separations, as will be subsequently pointed out. Furthermore, potential measurements are taken on the steepest portion of the potential curve where higher values of potential are obtained and the greatest variations resulting from electrical inhomogeneities are produced. The electrodes in Fig. 3 are shown arranged in their relative positions on the line O—O of Fig. 2 in order to indicate the large differences in potential existing between the potential electrodes of each pair and to show the potential relations existing between the various electrodes shown in Figs. 1 and 3.

The potential existing between electrodes 31 and 32 is indicated by the dimension lines at b, and that existing between electrodes 41 and 42 at c.

It will be seen that the values of potential represented by b and c are much greater than the value represented by a and that they also represent a larger percentage of the total potential between the electrodes 3 and 4. Experience has also proven that the largest percentage variation in potential produced by subsurface structure changes, is produced in that portion of the potential curve which lies closely adjacent to the energizing electrodes.

When utilizing the apparatus shown in Fig. 3 to practice the method of my invention, I may adjust the current supplied by the current supply 1 to a constant value, as indicated by the ammeter A, and take potential measurements on the measuring devices 33 and 43. After taking a reading at a given separation of the electrodes 3 and 4, the separation therebetween may be varied, for example increased, and the two pairs of potential electrodes 31, 32 and 41, 42 are concurrently moved to new positions adjacent the respective electrodes 3 and 4. The current supply means 1 may then be readjusted to give the same value of current as indicated by the ammeter A, as in the previous location and the potential at 33 and 43 may then be recorded in order to obtain a comparison of the corresponding current and potential values.

If no communication is available between the operators stationed at the instruments 33 and 43 and the operator adjacent the ammeter A and the power supply 1, a pre-arranged time schedule may be made so that the respective operators will take their measurements and adjust the current to given values at certain specified times. If telephonic communication is available, an example of which will be described in relation to Fig. 5, the respective operators may signify their readiness to take readings at the given locations. In this event it would not be necessary to maintain a constant value of current through the earth between the electrodes 3 and 4, but each operator, for example the operator at 33, would signify that a reading had been made at that station and would give the reading to the operator adjacent the ammeter A, who would record that reading and the reading of the ammeter A at a time corresponding to the reading taken at 33. It will be readily apparent to anyone experienced in field operation that such a procedure will not be most efficient as regards rapidity of readings and it also is subject to errors in non-coordination of the respective potential and current readings.

Figure 5:
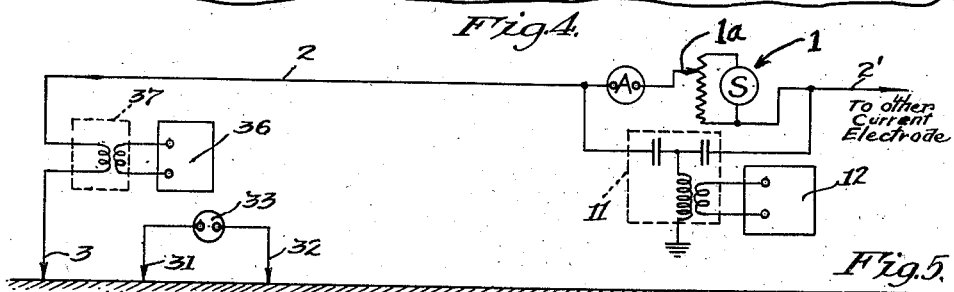
Fig. 5 is a diagrammatic view corresponding in general to Fig. 3, showing diagrammatically certain additional equipment which is advantageous in the practice of my invention.

A preferred apparatus and field procedure which has proven to be of great practical value, combined with the highest accuracy and speed of operation will now be described. Referring to Fig. 5, the power supply 1, the conductors 2 and 2' and the electrode 3 are shown along with a diagrammatically illustrated carrier telephone arangement which may be utilized to establish communication between the respective operators. The carrier station adjacent the operator located at 33 may comprise a carrier frequency transmitter and receiver indicated at 36 which may be of any conventional and well-known type. The device 36 is shown connected through a suitable coupling device 37 which is connected to the conductor 2 and may comprise a transformer, or other suitable means, according to established practice. A comparable coupling device is shown at 11 and is connected to the conductor 2 and to the conductor 2' on the opposite sides of the ammeter and current supply and to a suitable carrier telephone receiver and transmitter 12 which may be used by the operator stationed adjacent the current supply device 1 and the ammeter A, to communicate with the operators stationed adjacent the measuring devices 33 and 43. These carrier telephone devices are relatively inexpensive as compared to the cost of wire for maintaining wire communications between the respective operators and are of relatively light weight, and also the existing conductors 2 and 2' may be utilized for the purposes of communication. The signalling devices noted at 12 and 36 may comprise either transmitters or receivers; however, I find it preferable to utilize transmitters and receivers for each signalling device in order to establish two-way signalling and to couple the signalling device 36 to the conductor 2 through a transformer in series therewith and to couple the device 12 to a coupling device connected across the source of power and in shunt with the conductor 2 through a connection to the earth adjacent the source 1.

The apparatus shown in Figs. 3 and 5 may be used advantageously to practice the method of my invention in a somewhat modified form, in that the current flowing through the earth between the electrodes 3 and 4 is adjusted to give a particular value of potential, for example, between the points at which the electrodes 31 and 32 are located, for each new position of the electrodes.

The electrodes 3 and 4 may be located at a given distance from one another and at a given signal from the operators stationed adjacent the measuring devices 33 and 43, the operator adjacent the current supply device 1 may set the device in operation to establish a flow of current through the earth between the electrodes 3 and 4 and may gradually adjust the current to increasingly higher values, as indicated by the ammeter A, by manipulating, for example, a rheostat 1a or other suitable current control means included in the current supply device 1. The operators stationed adjacent the devices 33 and 43 signal the operator at 1 when the potential indicated by their respective potential measuring devices reaches a certain predetermined value. The operator at 1 would then record the value of current as indicated by the ammeter A at the time each of the operators at 33 and 34 had given the signal. The electrodes 3 and 4 are then moved to new positions, for example, outwardly along the line joining the two electrodes, and the two pairs of measuring electrodes are also moved to corresponding new positions, and measurements taken at this new position or location in exactly the same manner as at the previous location or locations, that is, the current is recorded which gives a predetermined value of potential at each of the pairs of measuring electrodes. This potential is maintained constant throughout a series of readings. Switching means may be provided for giving various values of potential, say 20, 50, 100, and 200 millivolts, to adapt the apparatus for operation in various areas.

It will be appreciated that numerous forms of signalling systems and numerous forms of coupling devices may be employed. For example, buzzers may be suitably coupled to the energizing circuit, as through transformers, adjacent the potential indicating instruments and a receiver may be coupled to the energizing circuit adjacent the current adjusting and indicating means, so that the operators adjacent the respective potential indicating devices may signal to the operator adjacent the current adjusting and indicating means.

It will be appreciated that numerous procedures may be employed for changing the position or location of one or both of the current electrodes in order to take a series of measurements which will give the desired information concerning the geologic nature and characteristics of the subsurface of the area which is undergoing survey. For example, one of the current electrodes may remain fixed and the other current electrode may be moved to various progressive positions along a line joining the two current electrodes, or the spacing between the two electrodes from a central reference point may be varied progressively either inwardly or outwardly along a line joining the two electrodes, both of which procedures give the relationship between depth of penetration versus an electrical property.

In another arrangement, one of the current electrodes may remain fixed in position and the other current electrode may be moved in an arc in various horizontal azimuths, preferably at a fixed distance from the stationary current electrode, to give the relationship between direction-of-measurement versus an electrical property. This type of measurement shows the anisotropic properties of the subsurface with particular reference to direction of stratification, sloping contacts, etc.

Another arrangement consists in maintaining the two current electrodes at a fixed distance apart, thereby maintaining an approximately constant depth of penetration, and moving the configuration across the area to be examined. The configuration may be moved along a line joining the electrodes, or in a direction perpendicular thereto. This type of measurement results in lateral exploration and is of special value in locating faults, contacts, and other lateral discontinuities.

In each case I prefer to arrange all of the electrodes substantially along a single straight line according to the manner shown in Fig. 4, and to maintain a spacing between any current electrode and its nearest potential electrode which is on the order of less than one-fifth and preferably less than one-eighth of the total spacing between the current electrodes at any particular measurement and to maintain a spacing between the two potential electrodes of any pair which is less than one-fifth the total spacing between the current electrodes for that particular measurement.

The spacing between any current electrode and its nearest potential electrode need not be very great since practically the only limitation is that the potential electrode should be far enough away from the current electrode so as not to be affected by the relatively high contact drop which occurs at the current electrode. The contact drop effects are usually dissipated within a few feet of the electrode and are practically independent of the distance between any pair of current electrodes so that a statement of the percentage spacing required for the nearest potential electrode will not hold true over all values of separation for the current electrodes. Therefore, in practice the nearest potential electrode is usually maintained at the same distance from a particular current electrode irrespective of the distance between the current electrodes, and this distance will always be less than one-fifth, and usually less than one-eighth, of the total separation of the current electrodes at any particular time during a survey. Under some circumstances measurements may be taken between an energizing electrode and another potential electrode. Thus one of the two points previously referred to may be located at an energizing electrode.

The same considerations hold true for the distances between the respective electrodes in each pair of potential electrodes and this distance is usually maintained constant for wide variations of the separation between the two current electrodes.

In present methods, the spacing between potential and energizing electrodes is maintained at a constant ratio, which necessitates introducing mathematically the electrode spacing into the calculations. For instance, when an equal spacing between electrodes is maintained, as spacing in Fig. 1, the formula for resistivity reduces to the mathematical relationship $$\rho = 2\pi a \frac{E}{I}$$

Where $\rho$ = resistivity
$a$ = spacing between electrodes
$E$ = potential between potential electrodes
$I$ = energizing current In one form of my method, wherein the spacing between the measuring electrodes and the adjacent power electrode and the value of E remains constant, the interpretation may be based upon a simple relationship $$\frac{1}{I}$$

i. e., the reciprocal of the current. This simplifies calculation of results, and if a conductivity factor is used, the current may be plotted directly versus the separation between current electrodes.

As an example of spacings which may be used in a survey in which the distance between the energizing electrodes is varied progressively, from say, 5,000 to 15,000 feet in forty-foot intervals, the potential measuring devices would be located adjacent the energizing electrodes and the potential electrodes would trail behind the energizing electrodes by distances of 200 and 1,200 feet, respectively. For example, as shown in Fig. 4, the distance between the electrodes 3 and 4 would vary from 5,000 to 15,000 feet, while the distance between the electrodes 3 and 31 and 4 and 41, respectively, would remain at 200 feet and the distance between the electrodes 31 and 32 and 41 and 42 respectively, would remain at 1,000 feet.

Thus the spacing of the potential electrode nearest an energizing electrode would vary from four per cent at 5,000 feet to one and three-tenths per cent at 15,000 feet, of the total spacing between energizing electrodes, while the spacing between the potential electrodes would vary from twenty per cent to six and six-tenths per cent. In all cases the spacing between potential electrodes was less than one-fifth the distance between the current electrodes and the nearest potential electrode was spaced from its energizing electrode by a distance which was less than one-fifth of said distance, in fact, less than one-eighth of said distance. Such a survey would be relatively simple to lay out, since all of the points along a line are at equal intervals. A very material saving is made in wire since the total wire is only about 2,000 feet more than the total separation between the current electrodes.

It should be noted that the spacing between any current electrode and its nearest potential electrode and also the spacing between the potential electrodes of any pair is only a very small percentage of the total separation of the current electrodes. Practically the only limitation on this spacing is that the potential electrodes should be located sufficiently distant from the energizing electrodes so as not to be affected by near-surface inhomogeneities and so as not to be affected by the relatively high and variable potential drop which occurs at an energizing electrode.

Figure 6:
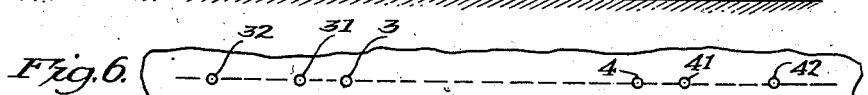
Figs. 6 and 7 are plan views of other field arrangements which are useful according to my invention.

The potential electrodes are shown placed at points located outwardly of the energizing electrodes 3 and 4 and substantially on the straight line passing through said electrodes, in Fig. 6, and spaced therefrom according to the manner described in Fig. 4.

Figure 7:
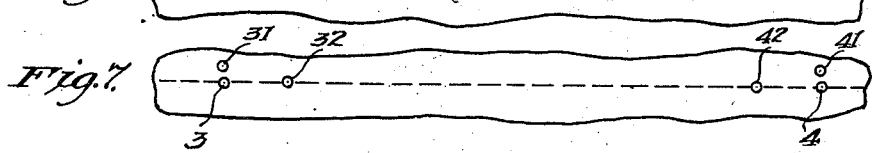

In Fig. 7 the potential electrodes 31 and 41 are shown placed at points located closely adjacent, and at one side of, the respective energizing electrodes 3 and 4. The electrodes 31 and 41 could be located from five to fifty feet, for example, to one side of the energizing electrodes, while the electrodes 32 and 42 would be respectively located at points spaced therefrom by a distance on the order of less than one-fifth the distance between the energizing electrodes 3 and 4. It will be appreciated that the points at which the electrodes 32 and 42 are located may occupy positions outwardly of the electrodes 3 and 4, as shown in Fig. 6, when the electrodes 31 and 41 are located as shown in Fig. 7. It is also appreciated that numerous electrode arrangements may be utilized to carry out the method of this invention. The above arrangements are illustrative only, and numerous other arrangements may be utilized without departing from the spirit of this invention.

The data obtained may be analyzed by plotting two curves showing the potential relationships at each of the two current electrodes, and then comparing the two curves. Deep structural effects which influence the flow of current between the two electrodes will reflect or manifest themselves on both curves; i. e., the two curves will coincide or exhibit similar rates of change. Near-surface effects adjacent either of the current electrodes will reflect themselves only on the curve of that particular electrode and as a result the two curves will exhibit different inflection points. A third curve may now be drawn by inspection which is an average or effective evaluation of the two original curves, and which contains the characteristics that were present on both curves, and which does not contain the characteristics that occurred singly on one of the curves. This average curve may now be employed for determining changes in subsurface structure by comparing it with a similarly derived curve for another station in the vicinity, as described in my copending application Serial No. 12,640, filed March 23, 1935.

I claim:

1. The method of determining the geologic nature and characteristics of the subsurface, which comprises: passing an electric current through the earth between two spaced energizing electrodes electrically connected to the earth and spaced from one another a known distance along the earth's surface, to create a potential difference between two spaced points on the earth's surface adjacent one of said electrodes and separated from one another by a distance less than one-fifth of said known distance, at least one of said points being within a distance from said one electrode which is also less than one-fifth of said known distance; and measuring said current when the potential difference between said points has a known value.

2. The method of determining the geologic nature and characteristics of the subsurface, which comprises: passing an electric current through the earth between two spaced energizing electrodes electrically connected to the earth and spaced from one another a known distance along the earth's surface, to create a potential difference between two spaced points on the earth's surface, said points being located adjacent one of said electrodes and on the side of said one electrode away from the other electrode and substantially on a straight line passing through said electrodes and being separated from one another by a distance less than one-fifth of said known distance, at least one of said points being within a distance from said one electrode which is also less than one-fifth of said known distance, the current passed through the earth and the potential difference between said two points during passage of said current constituting two quantities whose relation is dependent upon the geologic nature and characteristics of the earth traversed by said current; and measuring one of said quantities while the other quantity has a known value.

3. The method of determining the geologic nature and characteristics of the subsurface, which comprises: passing an electric current through the earth between two spaced energizing electrodes electrically connected to the earth and spaced from one another a known distance along the earth's surface, to create a potential difference between two spaced points on the earth's surface adjacent one of said electrodes and separated from one another by a distance less than one-fifth of said known distance, one of said points being located substantially on a straight line passing through said electrodes and the other of said points being within a distance of from five to fifty feet from said one electrode and to one side of said line, the current passed through the earth and the potential difference between said two points during passage of said current constituting two quantities whose relation is dependent upon the geologic nature and characteristics of the earth traversed by said current; and measuring one of said quantities while the other quantity has a known value.

4. The method of determining the geologic nature and characteristics of the subsurface, which comprises: passing an electric current through the earth between a pair of energizing electrodes which are electrically connected to the surface of the earth and spaced from one another along the surface thereof; repeating such passage of such an electric current when said electrodes have different spacial relationships on the surface of the earth; impressing a predetermined potential across a pair of electrodes which are electrically connected to the earth and located at points spaced from one another along the surface thereof by a distance which is less than one-fifth the distance between said energizing electrodes, one of said points being located adjacent one of said energizing electrodes and separated therefrom by a distance which is less than one-fifth the total distance between said energizing electrodes; and determining variations in the value of said current required to produce a potential between said points which is equal to said impressed potential at each of the spacial arrangements of said electrodes.

5. An apparatus for use in determining the geologic nature and characteristics of the subsurface, comprising: a pair of electrodes electrically connected to the earth and spaced from one another a known distance along the earth's surface; an electric circuit connected to said electrodes and including a source of electric current and means for indicating the value of said current; and a potential indicating device electrically connected to the earth at two points on the earth's surface adjacent one of said electrodes and located on the side of said one electrode away from the other electrode and substantially on a straight line passing through said electrodes, said points being separated from one another by a distance less than one-fifth of said known distance, at least one of said points being within a distance from said one electrode which is also less than one-fifth of said known distance.

6. An apparatus for use in determining the geologic nature and characteristics of the subsurface, comprising: a pair of electrodes electrically connected to the earth and spaced from one another a known distance along the earth's surface; an electric circuit connected to said electrodes and including a source of electric current and means for indicating the value of said current; and a potential indicating device electrically connected to the earth at two points on the earth's surface adjacent one of said electrodes, said points being spaced from one another by a distance less than one-fifth of said known distance, one of said points being located substantially on a straight line passing through said electrodes and the other of said points being within a distance of from five to fifty feet from said one electrode and to one side of said line.

7. In an apparatus for use in determining the geologic nature and characteristics of the subsurface, in which a conductor is used to carry an electric energizing current between a source of power and an energizing electrode in electrical contact with the earth, the combination of a coupling device comprising a transformer connected in series with said conductor and connected to a signalling device, and another coupling device connected across said source of power and in shunt with said conductor through a connection to the earth adjacent said source of power and connected to another signalling device, whereby signals may be transmitted over said conductor between said signalling devices.

JOHN JAY JAKOSKY.